(12) United States Patent
Vukovic

(10) Patent No.: US 8,998,598 B2
(45) Date of Patent: Apr. 7, 2015

(54) PRESS ASSEMBLY AND COUPLING MECHANISMS FOR SAME

(71) Applicant: Element Six Abrasives S.A., Luxembourg (LU)

(72) Inventor: Dragan Vukovic, Didcot (GB)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 14/385,244

(22) PCT Filed: Mar. 22, 2013

(86) PCT No.: PCT/EP2013/056092
§ 371 (c)(1),
(2) Date: Sep. 15, 2014

(87) PCT Pub. No.: WO2013/144019
PCT Pub. Date: Oct. 3, 2013

(65) Prior Publication Data
US 2015/0037444 A1 Feb. 5, 2015

Related U.S. Application Data

(60) Provisional application No. 61/618,468, filed on Mar. 30, 2012.

(30) Foreign Application Priority Data

Mar. 30, 2012 (GB) .................................. 1205726.1

(51) Int. Cl.
*B01J 3/06* (2006.01)
*B30B 15/02* (2006.01)
*B30B 11/00* (2006.01)

(52) U.S. Cl.
CPC ............... *B30B 15/026* (2013.01); *B01J 3/067* (2013.01); *B30B 11/004* (2013.01); *B30B 11/007* (2013.01)

(58) Field of Classification Search
CPC ...... B01J 3/067; B30B 11/004; B30B 11/007; B30B 15/026
USPC ............................................ 425/77, 193, 330
See application file for complete search history.

(56) References Cited

U.S. PATENT DOCUMENTS 3,093,862 A 6/1963 Gerard et al.
6,336,802 B1 * 1/2002 Hall ................................ 425/77
(Continued)

FOREIGN PATENT DOCUMENTS

DE 102007010360 A1 9/2008

OTHER PUBLICATIONS

International Patent Application No. PCT/EP2013/056092, International Search Report mailed Jul. 15, 2013, 3 pages.

*Primary Examiner* — James MacKey
(74) *Attorney, Agent, or Firm* — Dean W. Russell; Kilpatrick Townsend & Stockton LLP

(57) ABSTRACT

A press assembly for pressurizing a body, comprising a frame and a cartridge for applying load to the body, in which the frame comprises a bore for accommodating the cartridge. The press assembly further comprises an axial securement mechanism for securing the cartridge axially within the bore and a radial securement mechanism for securing the cartridge radially within the bore. The press assembly is configured such that the cartridge can be rotated in the bore between a locked condition and an unlocked condition. The radial and axial securement mechanisms are cooperatively configured with respect to each other so when the cartridge is in the locked condition, both the radial and axial securement mechanisms are engaged and when the cartridge is in the unlocked condition the radial and axial securement mechanisms are both disengaged and there is a clearance gap between the cartridge and the bore permitting the cartridge to be axially displaceable within the bore.

25 Claims, 7 Drawing Sheets

(56) References Cited

U.S. PATENT DOCUMENTS

| | | |
|---|---|---|
| 7,186,104 B2 * | 3/2007 | Hall et al. ............ 425/77 |
| 7,354,262 B2 * | 4/2008 | Hall et al. ............ 425/77 |
| 2002/0025354 A1 * | 2/2002 | Hall ............ 425/174.6 |
| 2007/0009626 A1 | 1/2007 | Hall et al. |
| 2007/0122512 A1 | 5/2007 | Hall et al. |
| 2011/0104318 A1 | 5/2011 | Hall et al. |

\* cited by examiner

PRESS ASSEMBLY AND COUPLING MECHANISMS FOR SAME

CROSS REFERENCE TO RELATED APPLICATIONS

This application is the U.S. national phase of International Application No. PCT/EP2013/056092 filed on Mar. 22, 2013, and published in English on Oct. 3, 2013 as International Publication No. WO 2013/144019 A1, which application claims priority to Great Britain Patent Application No. 1205726.1 filed on Mar. 30, 2012 and U.S. Provisional Application No. 61/618,468 filed on Mar. 30, 2012, the contents of all of which are incorporated herein by reference.

This disclosure relates generally to coupling mechanisms for coupling components of a press assembly, particularly but not exclusively for ultra-high pressure press assemblies.

U.S. Pat. No. 6,336,802 discloses a unitary press frame and unitary cartridge bodies, the frame comprising intersecting bore holes with means of attachment to the cartridges. Axial threads along the inside diameter wall of boreholes comprise the means of attachment. Other means of attachment may comprise taper, friction, breech and or bolts.

There is a need for press assemblies in which a pressure-generating cartridge can be inserted into a bore of a press frame with relatively little contact or no contact between the cartridge and the bore and subsequently be secured within the bore, particularly but not exclusively where the cartridge is massive.

Viewed from a first aspect there is provided a press assembly for pressurising a body, comprising a frame and a cartridge for applying load to the body, in which the frame comprises a bore for accommodating the cartridge; the press assembly further comprising an axial securement mechanism for securing the cartridge axially (longitudinally) within the bore and a radial securement mechanism for securing the cartridge radially (laterally) within the bore; the press assembly being configured such that the cartridge can be rotated in the bore (azimuthally about the longitudinal axis of the bore) between a locked condition and an unlocked condition; the radial and axial securement mechanisms being cooperatively configured with respect to each other so when the cartridge is in the locked condition, both the radial and axial securement mechanisms are engaged and when the cartridge is in the unlocked condition the radial and axial securement mechanisms are both disengaged and there is a clearance gap between the cartridge and the bore permitting the cartridge to be axially displaceable within the bore.

Various combinations and arrangements are envisaged by this disclosure, of which the following are non-limiting, non-exhaustive examples:

In some example arrangements, the cartridge can be oriented azimuthally about the longitudinal axis of the bore so that the radial and axial securement mechanisms are not engaged and there is a clearance gap between the cartridge and the bore (and the press assembly is in the unlocked condition). The press assembly may be configured so that the clearance gap can extend azimuthally all the way around the cartridge, and or so that it is possible for substantially no part of the cartridge to be in contact any part of the frame, when in the unlocked condition. The clearance gap may vary according azimuthal and or axial position about the cartridge in the unlocked condition, or the clearance gap may be substantially invariant.

Example arrangements may have the aspect that the insertion shaft can be fully inserted into the bore of the frame and put in the unlocked condition substantially without contacting the bore and without substantial friction or sliding forces arising between the insertion body and the bore. In such arrangements, substantial contact between respective parts of the insertion shaft and the frame will occur responsive to the insertion shaft being rotated about its longitudinal axis to engage the radial and axial securement mechanisms and put it into the locked condition.

The bore may be open at both a proximate end and a distal end, or the bore may be open at the proximate end and closed at the distal end, the press assembly being configured such that the body to be pressurised can be accommodated at the distal end of the bore.

The press assembly may comprise more than one radial securement mechanism. In one arrangement, at least two radial securement mechanisms may be provided to secure radially the cartridge proximate opposite ends of the bore.

The radial securement mechanism may comprise two sets each comprising at least two circumferentially spaced apart abutment structures; the abutment structures of the first set projecting radially outward from the cartridge and the abutment structures of the second set projecting radially inward from the bore of the frame; both sets of abutment structures being cooperatively configured so that when the radial securement mechanism is in the disengaged condition (and the press assembly is in the unlocked condition), each abutment structure of each set can be positioned (azimuthally) between adjacent abutment structures of the other set; and when the radial securement mechanism is in the engaged condition, each abutment structure of each set radially abuts a corresponding respective abutment structure of the other set; the cartridge being rotatable between the disengaged and engaged conditions.

Examples of abutment structures may include lobes, bosses, ridges or ribs.

Each set may comprise two, three, four or more than four abutment structures and each set may have the same number of abutment structures as the other. Arrangements in which there are three abutment structures in each set are likely to provide sufficiently stable radial securement.

The sets of abutment structures may be configured and dimensioned so that when the radial securement mechanism is in the disengaged condition, each abutment structure of each set can be inserted between adjacent abutment structures of the other set without contacting them, a clearance gap being provided between the respective abutment structures.

The abutment structures in each set may be substantially the same shape and size and the abutment structures in both sets may have substantially the same shape and size.

When in the engaged condition, corresponding abutment structures in each set may abut each other at respective bearing end surfaces of the abutment structures.

The bearing end surfaces of the abutment structures of at least one of the sets may be configured so that when the cartridge is rotated from the disengaged condition to the engaged condition, there is initially a radial clearance gap between corresponding abutment structures of each set for allowing the abutment structures to contact each other with increasing radial force as the cartridge is rotated the radial force, reaching a maximum value when the radial securement mechanism is fully engaged and the press assembly is in the locked condition. In an example arrangement, the bearing end surfaces of an abutment structure may be configured to have two radii of curvature on a plane of the rotation, an area of the end surface adjacent a shoulder of the abutment structure having a smaller radius of curvature in the plane of rotation than that of an inner or central area of the end surface remote from the shoulder. In general, the abutment structure may have any of a variety of smooth curvatures, provided that the face of the abutment structure is substantially smooth and has a curvaceous topography for allowing the abutment structures to slide on each other as the cartridge is rotated. The curvaceous topography may comprise arcuate and or parabolic topographies.

In some example arrangements, the press assembly may comprise more than one radial securement mechanism according to this disclosure. For example, a disclosed radial securement mechanism may be provided at or near both ends of the bore and at corresponding axial positions on the cartridge.

The axial securement mechanism may comprise inter-engagement structures, a first of which is provided on the cartridge and a second of which is provided on the bore of the frame; the inter-engagement mechanisms cooperatively configured to permit the cartridge to be fully inserted into the bore when the axial securement mechanism is in the disengaged condition and to be rotated in the bore to put the axial securement mechanism in the locked condition, in which the first and second inter-engagement structures axially (longitudinally) abut each other to prevent substantial longitudinal (axial) displacement when in the engaged condition.

The axial securement mechanism may comprise interrupted circumferential ridges.

Examples of inter-engagement structures may include lobes, bosses, ridges or ribs.

In some example arrangements, the axial securement mechanism may comprise two sets of circumferentially spaced apart inter-engagement structures; the inter-engagement structures of the first set projecting radially outward from the cartridge and the inter-engagement structures of the second set projecting radially inward from the bore of the frame; both sets of inter-engagement structures being cooperatively configured so that when the axial securement mechanism is in the disengaged condition (and the press assembly is in the unlocked condition), each inter-engagement structure of each set can be positioned azimuthally between adjacent inter-engagement structures of the other set; and when the axial securement mechanism is in the engaged condition, each inter-engagement structure of each set longitudinally (axially) abuts a corresponding respective inter-engagement structure of the other set; the cartridge being rotatable between the disengaged and engaged conditions.

Each set may comprise two, three, four or more than four inter-engagement structures and each set may have the same number of inter-engagement structures as the other.

The inter-engagement structures may be configured and dimensioned so that when the axial securement mechanism is in the disengaged condition, the cartridge can be fully inserted into the bore without the first and second inter-engagement structures contacting each other, a clearance gap being provided between the inter-engagement structures.

The inter-engagement structures in each set may be substantially the same shape and size and the inter-engagement structures in both sets may have substantially the same shape and size.

The axial securement mechanism may comprise a plurality of series of inter-engagement structures, a first series being provided on the cartridge and a second series being provided on the bore of the frame; the inter-engagement structures of the first series may be arranged spaced apart axially (longitudinally) along the cartridge and the inter-engagement structures of the second series may be arranged spaced apart axially (longitudinally) along the bore, the first and second series being axially staggered with respect to each other so that the inter-engagement structures of each corresponding series are alternately located axially (longitudinally) along the bore and the cartridge, each inter-engagement structure of the first series abutting at least one adjacent inter-engagement structure, and or interlocking between two inter-engagement structures, of the second series. A chamfer or other smooth curvature may be incorporated on the leading edges of the inter-engagement structures on either or both the cartridge and the bore of the frame to accommodate axial (longitudinal) misalignment as the cartridge is rotated and the inter-engagement structures engage. The correct axial (longitudinal) position of the cartridge on the bore of the frame is achieved by means location seats. The press assembly may comprising corresponding location seats, for example a pair of corresponding location seats, provided on the cartridge and on the frame, the location seats cooperatively arranged such that when the cartridge is inserted into the bore of the frame, the corresponding location seats abut one another to limit longitudinal displacement of the cartridge with respect to the bore and the corresponding inter-engagement structures on the cartridge and the frame can inter-engage each other without mechanical interference when the insertion body is rotated in the bore. The location seats may be positioned at the proximate or distal end of the bore. Friction can be reduced by means of an axial bearing between the pair of locating seats.

The axial securement mechanism may comprise a first and second set comprising at least two series of inter-engagement structures in each set; the series within each set being circumferentially spaced apart on the cartridge and in the bore, respectively.

There may be two, three, four or more than four series of inter-engagement structures provided on the cartridge and on the bore.

The number, configuration and size (or sizes) of the inter-engagement structures may be selected to distribute axial forces between the cartridge and the frame according to a desired distribution. Such forces may arise when the inter-engagement structures of the cartridge and the bore act/react against each other responsive to a force tending to urge cartridge from the bore. It may be desired to distribute such forces such that the risk of deformation or breakage of the cartridge or the frame is reduced or minimised, for example. The inter-engagement structures should be configured so that the yield strength of the material or materials of the cartridge and the frame would not be exceeded by the action/reaction forces between them under conditions of normal intended use of the press assembly.

The frame may form a generally closed structure, forming an enclosure about a cavity for accommodating the body to be pressurised, at least when any additional bore holes are closed or contain inserted elements.

In some example arrangements, the press assembly may be for pressurising a body at an applied pressure of at least about 1 GPa, at least about 5 GPa, at least about 7 GPa or at least about 10 GPa. The cartridge may comprise a hydraulic system, including a hydraulic cylinder and a piston. The frame may comprise a unitary body or it may comprise a plurality of elements connected together, such as by pin or clamp mechanisms. The frame may have a generally cubic geometry and may have six bore holes through each of six sides, each bore hole configured for accommodating a respective cartridge.

Non-limiting example arrangements will be described with reference to the accompanying drawings, of which FIG. 1 shows a schematic side view of part of an example press assembly, in which the cartridge is withdrawn from the bore of the frame (which is shown in cross section);

Figure 1:
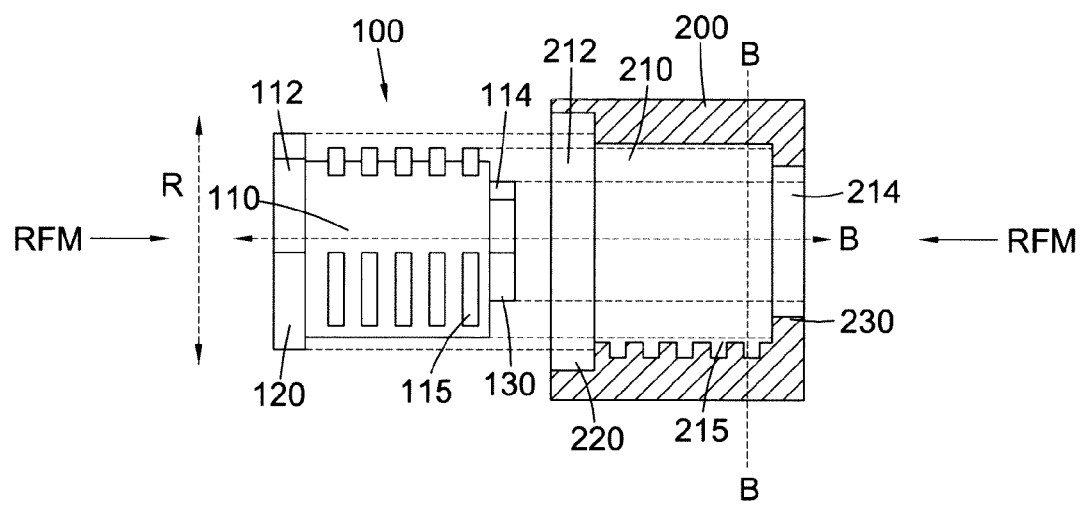

FIG. 1 shows a schematic longitudinal side view of part of an example press assembly comprising a cartridge 100 withdrawn from the bore 210 of a frame 200 (the frame 200 is shown in longitudinal cross section). The axial direction is indicated by "A" and the radial direction by "R". The cartridge 100 comprises a generally cylindrical body 110 provided with two radial fastening mechanisms 112, 114, one at a proximate (rear) end and the other at the opposite distal end (front).

The radial fastening mechanism 112 at the proximate end comprises three circumferentially spaced apart abutment structures 120 projecting radially outward from the body 110. The radial fastening mechanism 114 at the distal end comprises three circumferentially spaced apart abutment structures 130 projecting radially outward from a nose member extending axially forward from the body 110. Corresponding inwardly projecting abutment structures 220, 230 are provided on the press frame 200 at the proximate 212 and distal 214 of the bore 210. The locating seat 140 at the distal end of the insertion body 100 will make contact with the locating seat 240 at the distal end of the frame 200.

Figure 3:
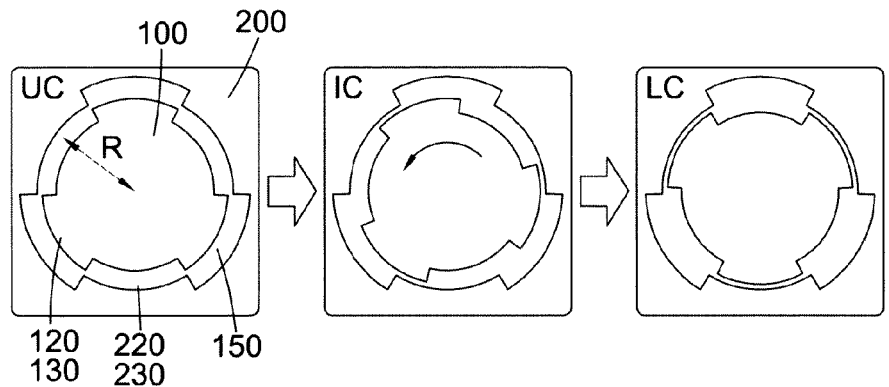
FIG. 3 shows a schematic end view of an example radial securement mechanism from the perspectives RFM indicated in FIG. 1 (the same type of radial securement mechanism is shown at both ends of the press assembly in the example shown in FIG. 1)

FIG. 3 below shows the radial fastening mechanism in the unlocked condition UC, the locked condition LC and in an intermediate condition IC, as viewed in the direction RFM in FIG. 1 (the same mechanism is used at both ends of the cartridge). In the unlocked condition UC, the three radially outward projecting abutment structures 120, 130 of the cartridge 100 are circumferentially located between the corresponding radially inward projecting abutment structures 220, 230 of the press frame 200, and there is a clearance gap 150 between the cartridge 100 and the frame 200 extending all the way around the cartridge 100, including between the lobes 120, 130 and 220, 230.

Each of the abutment structures 120, 130 of the cartridge 100 is configured with two radii of curvature, the radius of curvature near the shoulders of each abutment structure 120, 130 being smaller than the radius of curvature at the central region of each abutment structure 120, 130. This is so that when the cartridge 100 is turned from the unlocked condition UC to the locked condition LC, there is initially some clearance between the shoulders of each abutment structure 120, 130 and the abutment structures 220, 230 of the frame 200. As the cartridge 100 is rotated by 60 degrees to the locked condition LC, the clearance reduces to zero and the abutment structures 120, 130 and 220, 230 abut each other to secure the cartridge 100 radially in position.

Figure 2:
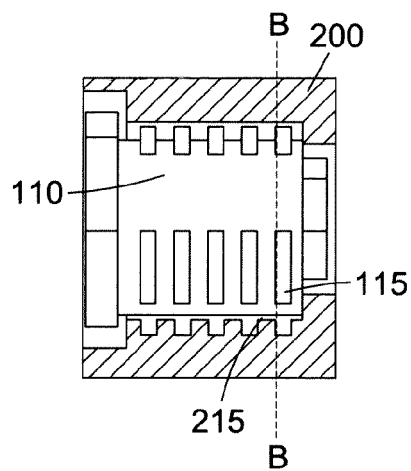
FIG. 2 shows a schematic side view of part of an example press assembly, in which the cartridge is inserted within the bore of the frame (which is shown in cross section), the press assembly being in the unlocked condition.

FIG. 2 below shows a schematic side view of the cartridge 100 fully inserted into the bore 200, still in the unlocked condition UC. The locating seat 140 at the distal end of the insertion body is in contact with the locating seat 240 at the distal end of the frame 200. The axial fastening mechanism involves a plurality of ribs 115 on the body 110 of the cartridge slotting between corresponding ribs 215 in the bore 210. There are three sets of ribs 115, 215 arranged on the cartridge body 110 and in the bore of the frame 200. The respective sets being equidistantly spaced apart from each other circumferentially around the cartridge body 110 on the one hand and the bore 210 on the other; each set comprising a respective series of ribs 115, 215 arranged axially along the cartridge body 110 on the one hand and the bore 210 on the other.

Figure 4:
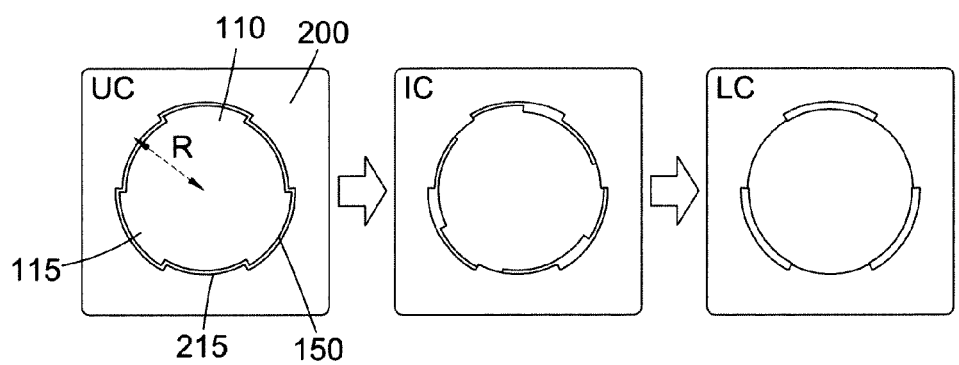
FIG. 4 shows a schematic section view of an example axial securement mechanism on the plane B-B in FIG. 2.
Figure 5:
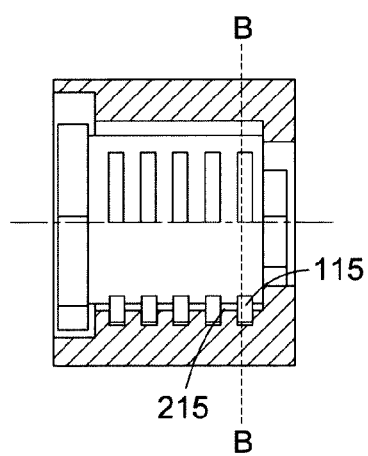
FIG. 5 shows a schematic side view of part of an example press assembly, in which the cartridge is inserted within the bore of the frame (which is shown in cross section), the press assembly being in the locked condition.

FIG. 4 below shows the axial fastening mechanism in the unlocked condition UC, the locked condition LC and in an intermediate condition IC, as viewed on the cross section plane B-B in FIG. 2. In the unlocked condition UC, the three radially outward projecting ribs 115 on the cartridge body 110 (one for each of the three sets) are circumferentially located between ribs 215 adjacent the grooves 216 on the plane B-B corresponding to the ribs 115 on the cartridge body 110. In this orientation, the cartridge can be axially inserted into or withdrawn from the bore without the ribs 115 contacting the bore 210 of the frame, since there is a clearance gap 150 between the ribs 115 and the bore 210 extending between the sides of adjacent ribs 115, 215. In the unlocked condition UC the ribs 115 of the cartridge body 110 and the ribs 216 of the bore are 60 degrees out of phase with each other.

As the cartridge is rotated by 60 degrees towards the locked condition LC, the ribs 215 on the cartridge body 110 will slot between corresponding adjacent ribs 215 in the bore, thus preventing the cartridge from being substantially displaced in the axial direction. This is shown from a side view in FIG. 1E below.

In the locked condition, the radial locking mechanisms and the axial locking mechanism thus cooperate to prevent substantial radial and axial displacement of the cartridge relative to the frame.

Figure 6:
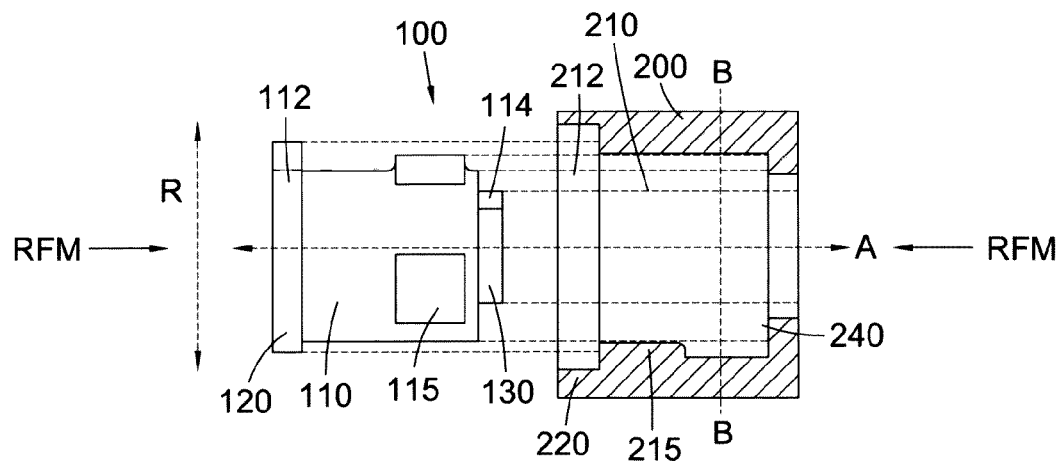
FIG. 6 shows a schematic side view of part of an example press assembly, in which the cartridge is withdrawn from the bore of the frame (which is shown in cross section)

FIG. 6 shows a schematic longitudinal side view of another example arrangement of a cartridge 100 withdrawn from the bore 210 of the frame 200 (the frame 200 is shown in longitudinal cross section). The axial direction is indicated by "A" and the radial direction by "R". The cartridge 100 comprises a generally cylindrical body 110 with radial fastening mechanisms 112, 114 at a proximate and distal ends. The locating seat 140 at the distal end of the insertion body 100 will make contact with the locating seat 240 at the distal end of the frame 200. The radial fastening mechanisms are the same as described with reference to FIG. 1 to FIG. 3.

Figure 7:
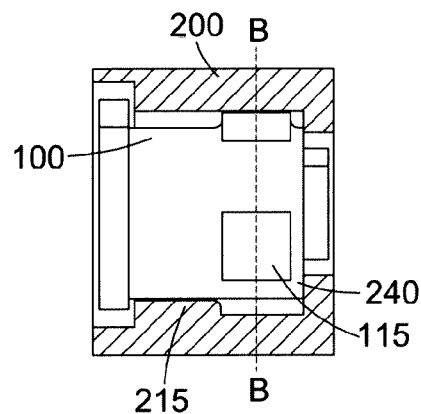
FIG. 7 shows a schematic side view of part of an example press assembly, in which the cartridge is inserted within the bore of the frame (which is shown in cross section), the press assembly being in the unlocked condition.

FIG. 7 shows a schematic side view of the cartridge 100 fully inserted into the bore 200, still in the unlocked condition. The axial fastening mechanism involves three inter-lock lobes 115 on the body 110 of the cartridge slotting between corresponding inter-lock lobes 215 in the bore 210 and a locating seat 240 provided at the distal end of the bore 210. The locating seat 140 at the distal end of the insertion body is in contact with the locating seat 240 of the frame 200. The inter-lock lobes 115, 215 are arranged equidistant from each other circumferentially around the cartridge body 110 on the one hand and the bore 210 on the other.

Figure 8:
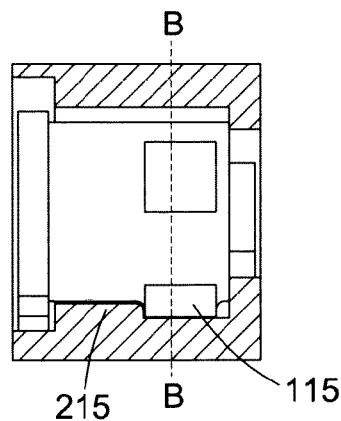
FIG. 8 shows a schematic side view of part of an example press assembly, in which the cartridge is inserted within the bore of the frame (which is shown in cross section), the press assembly being in the locked condition.
Figure 9A:
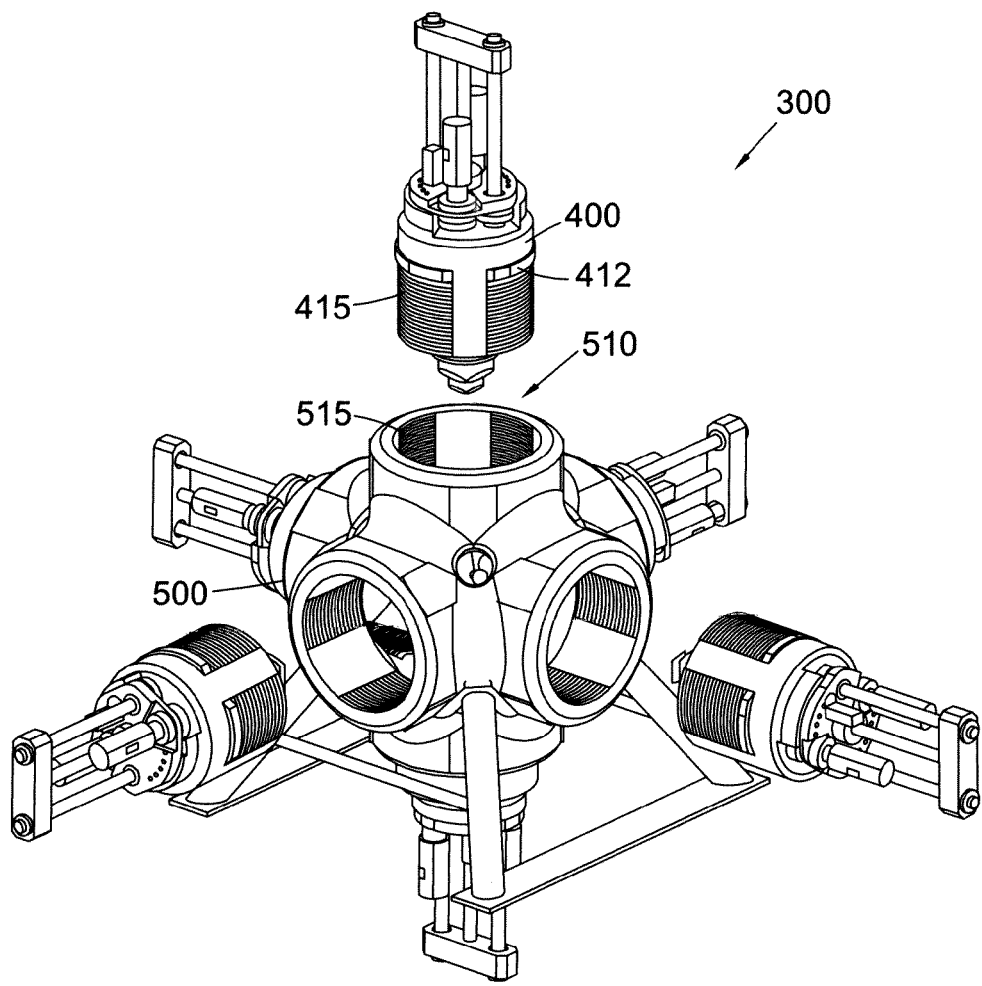
FIG. 9A shows a schematic drawing of an example cubic press system in which the hydraulic cartridges are withdrawn from the press frame.
Figure 9B:
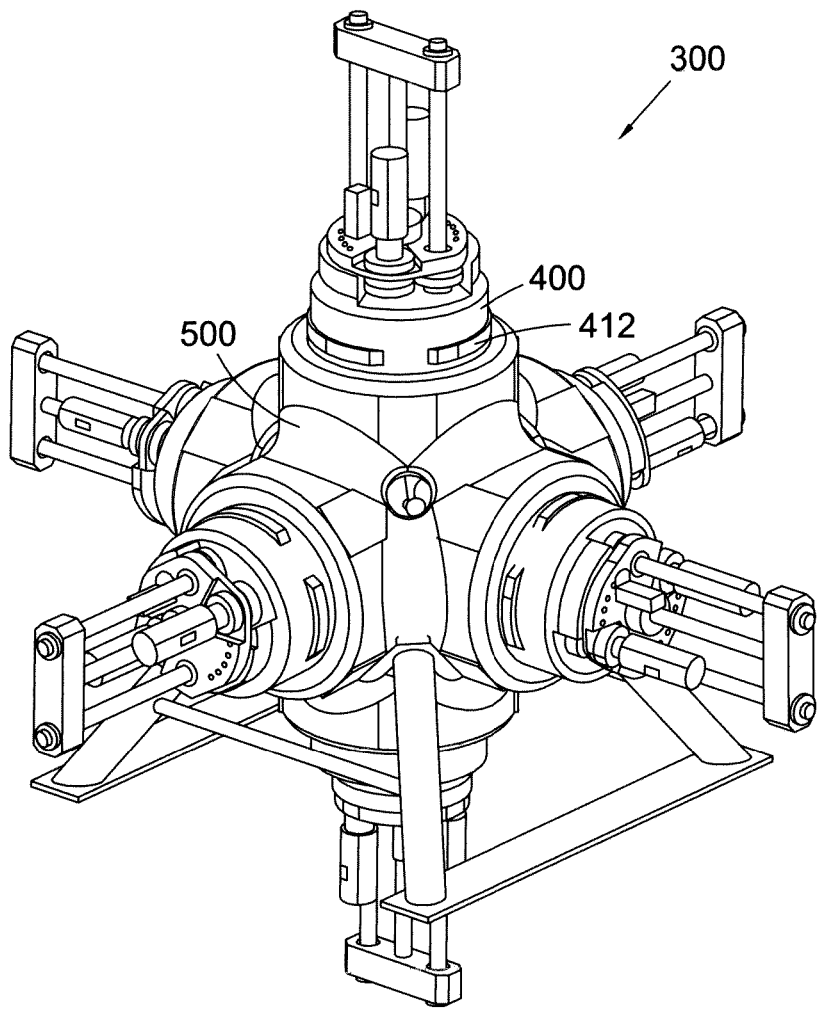
FIG. 9B shows the example cubic press of FIG. 9A in which the hydraulic cartridges are mounted on the press frame as in use.
Figure 9C:
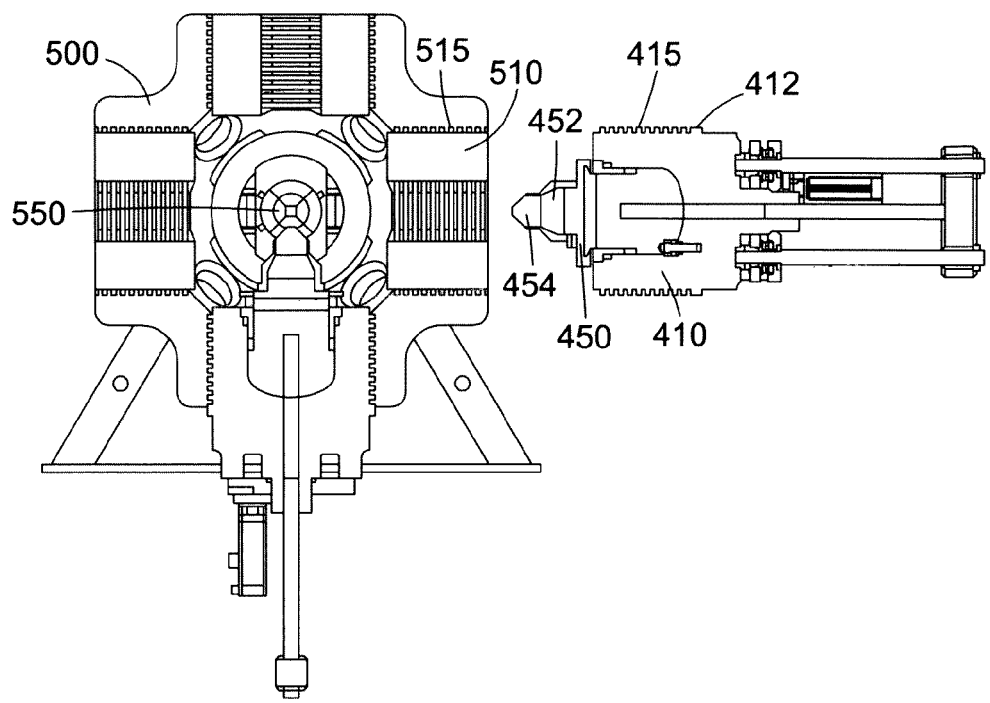
FIG. 9C shows a schematic cross section though the example press frame and one cartridge of the cubic press system of FIG. 9A with the cartridge withdrawn from the press frame.
Figure 9D:
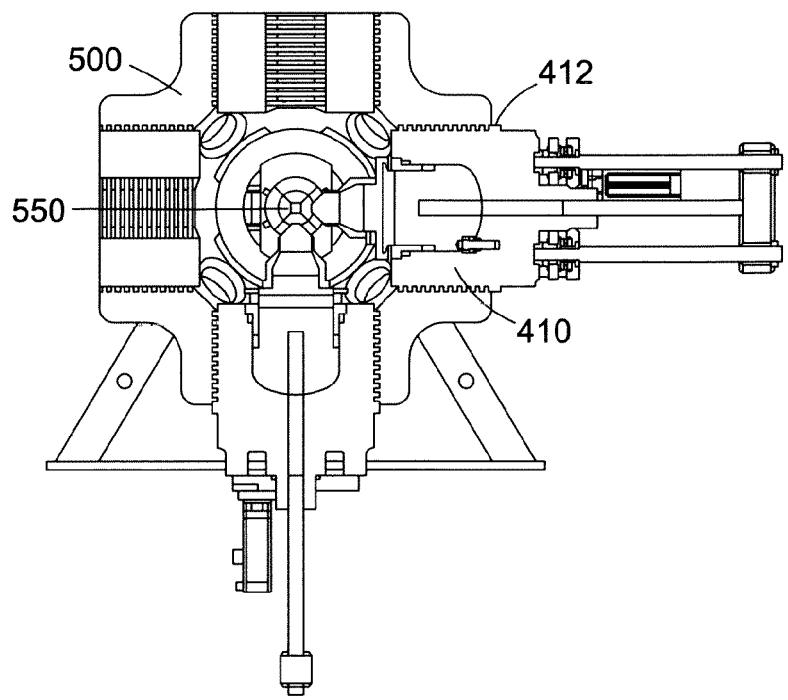
FIG. 9D shows a schematic cross section though the example press frame and one cartridge of the cubic press system of FIG. 9A with the cartridge mounted in the press frame.
Figure 9E:
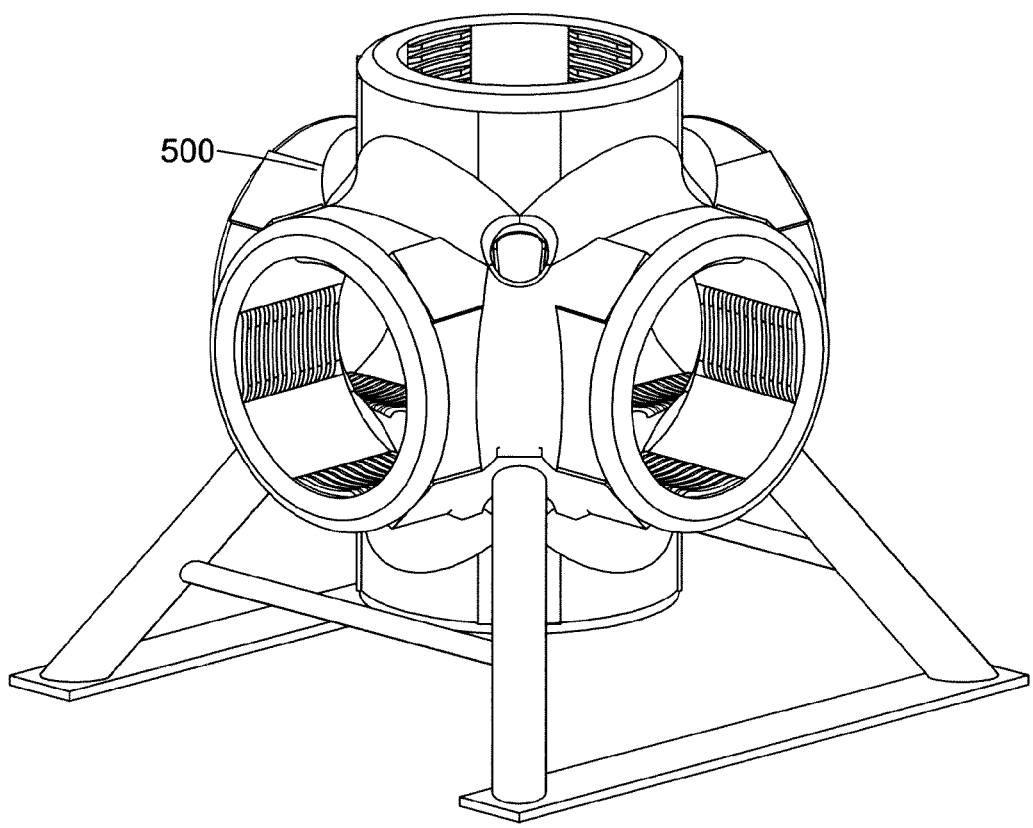
FIG. 9E shows an isometric perspective view of the cubic press frame of FIG. 9A.

As the cartridge is rotated by 60 degrees to the closed condition, the inter-lock lobes 115 on the cartridge body 110 will slot behind corresponding adjacent inter-lock lobes 215 in the bore, thus preventing the cartridge 100 from moving substantially in the axial direction. This is shown from a side view in FIG. 8 below.

With reference to FIG. 9A to FIG. 9E, an example cubic press system 300 comprises a unitary steel frame 500 having six sides, each side provided with a bore hole 510 for accommodating a respective hydraulic cartridge 400. The press frame 500 has a substantially spherical central chamber 550 for housing a capsule to be pressurised. Each cartridge 400 is mechanically fastened to the press frame 500 by respective axial and radial fastening mechanisms. Each cartridge 400 comprises a generally cylindrical body 410 provided with components a radial fastening mechanism 412 and axial fastening mechanism 415. The corresponding bore hole 510 is also provided with complementary components for the radial and axial 515 fastening mechanisms. The axial fastening mechanism involves a plurality of ribs 415 on the body 410 of the cartridge 500 slotting between corresponding ribs 515 in the bore 510. There are four sets of ribs 415, 515 arranged on each cartridge body 410 and in each respective bore hole 510, the respective sets being equidistantly spaced apart from each other circumferentially around the cartridge body 410 on the one hand and the bore hole 510 on the other; each set comprising a respective series of ribs 415, 515 arranged axially along the cartridge body 410 on the one hand and the bore 510 on the other.

When a capsule has been loaded into the central chamber, the six cartridges may be energised to drive the respective anvils onto the capsule from each of the six directions. Load will thus be applied onto the capsule and onto the press frame (in the opposite direction) via the fastening mechanisms between the frame and the cartridges.

The same kind of radial fastening mechanism is provided at the front and back ends of each cartridge to secure it radially to the front and back ends of each respective bore. The radial fastening mechanism is designed to allow the cartridge to be freely inserted into (and withdrawn from) the bore when in the unlocked condition and to prevent the radial displacement of the cartridge when in the locked condition. Transition between the locked and unlocked conditions will involved rotating the cartridge by 45 degrees about its longitudinal axis. The radial fastening mechanism comprises four abutment lobes projecting radially outward from the cartridge and four corresponding abutment lobes projecting radially inward from the bore of the press frame. The four abutment lobes on the cartridge and on the press frame are equidistantly spaced apart around the circumference of the cartridge on the one hand and in the bore on the other. The abutment lobes on the cartridge and frame are configured and dimensioned so that when the cartridge is fully inserted in the bore and in the locked condition, the cartridge abutment lobes will radially abut those of the frame, the cartridge thus being prevented from substantial radial displacement.

When being inserted into the bore in the unlocked condition, the cartridge will be oriented with its abutment lobes circumferentially between those of the frame and there will be a clearance gap between the cartridge and the bore, including between their respective abutment lobes, so that the cartridge can be freely inserted and withdrawn without contacting the bore. Once inserted, the cartridge can be put into the locked condition by rotating it by 45 degrees, causing the respective abutment lobes to abut each other radially. At the same time, the axial securement mechanism will be engaged.

Certain terms and concepts as used herein will be briefly explained below.

The azimuth or azimuthal position in a cylindrical coordinate system is the angular coordinate about the axial, or longitudinal, axis.

A unitary frame is one provided from a single cast or forged component, in contrast with a linked frame, which may comprise six components linked to each other by means of pins, for example.

Ultra-high pressure is at least about 1 GPa. Ultra-high pressure press assemblies may be suitable for manufacturing synthetic ultra-hard materials such as synthetic diamond, cubic boron nitride (cBN), polycrystalline diamond (PCD) material and polycrystalline cBN (PCBN) material.

The invention claimed is:

1. A press assembly for pressurising a body, comprising a frame and a cartridge for applying load to the body, in which the frame comprises a bore for accommodating the cartridge; the press assembly further comprising an axial securement mechanism for securing the cartridge axially within the bore and a radial securement mechanism for securing the cartridge radially within the bore; the press assembly being configured such that the cartridge can be rotated in the bore between a locked condition and an unlocked condition; the radial and axial securement mechanisms being cooperatively configured with respect to each other so when the cartridge is in the locked condition, both the radial and axial securement mechanisms are engaged and when the cartridge is in the unlocked condition the radial and axial securement mechanisms are both disengaged and there is a clearance gap between the cartridge and the bore permitting the cartridge to be axially displaceable within the bore; in which the axial securement mechanism comprises interrupted circumferential ridges.

2. A press assembly as claimed in claim 1, configured so that the clearance gap extends azimuthally all the way around the cartridge when in the unlocked condition.

3. A press assembly as claimed in claim 1, configured so that it is possible for no part of the cartridge to be in contact any part of the bore when in the unlocked condition.

4. A press assembly as claimed in claim 1, in which the bore is open at a proximate end and at a distal end, the press assembly being configured such that the body to be pressurised can be accommodated at the distal end of the bore.

5. A press assembly as claimed in claim 1, comprising more than one radial securement mechanism.

6. A press assembly as claimed in claim 1, in which at least two radial securement mechanisms are provided to secure the cartridge radially proximate opposite ends of the bore.

7. A press assembly as claimed in claim 1, in which the radial securement mechanism comprises two sets of circumferentially spaced apart abutment structures; the abutment structures of the first set projecting radially outward from the cartridge and the abutment structures of the second set projecting radially inward from the bore of the frame; both sets of abutment structures being cooperatively configured so that when the radial securement mechanism is in the disengaged condition, each abutment structure of each set can be positioned between adjacent abutment structures of the other set; and when the radial securement mechanism is in the engaged condition, each abutment structure of each set radially abuts a corresponding abutment structure of the other set; the cartridge being rotatable between the disengaged and engaged conditions.

8. A press assembly as claimed in claim 7, in which each set comprises four abutment structures.

9. A press assembly as claimed in claim 7, in which the sets of abutment structures are configured so that when the radial securement mechanism is in the disengaged condition, each abutment structure of each set can be inserted between adjacent abutment structures of the other set without contacting them, a clearance gap being provided between the respective abutment structures.

10. A press assembly as claimed in claim 7, in which corresponding abutment structures in each set abut each other at respective bearing end surfaces of the abutment structures when the radial securement mechanism is in the engaged condition.

11. A press assembly as claimed in claim 10, in which the bearing end surfaces of the abutment structures of at least one of the sets are configured so that when the cartridge is rotated from the disengaged condition to the engaged condition, there is initially a radial clearance gap between corresponding abutment structures of each set for allowing the abutment structures to contact each other with increasing radial force as the cartridge is rotated, the radial force reaching a maximum value when the radial securement mechanism is fully in the engaged condition.

12. A press assembly as claimed in claim 11, in which the bearing end surface of an abutment structure is configured to have a smooth and curvaceous topography for allowing the abutment structures to slide on each other as the cartridge is rotated.

13. A press assembly as claimed in claim 11, in which the bearing end surface of an abutment structure is configured to have two radii of curvature on a plane of the rotation, an area of the end surface adjacent a shoulder of the abutment structure having a smaller radius of curvature in the plane of rotation than that of an inner area of the end surface remote from the shoulder.

14. A press assembly as claimed in claim 1, in which the axial securement mechanism comprises inter-engagement structures, a first of which is provided on the cartridge and a second of which is provided on the bore of the frame, in which the first and second inter-engagement structures axially abut each other to prevent substantial axial displacement when in the engaged condition.

15. A press assembly as claimed in claim 1, in which the axial securement mechanism comprises two sets of circumferentially spaced apart inter-engagement structures; the inter-engagement structures of the first set projecting radially outward from the cartridge and the inter-engagement structures of the second set projecting radially inward from the bore of the frame; both sets of inter-engagement structures being cooperatively configured so that when the axial securement mechanism is in the disengaged condition, each inter-engagement structure of each set can be positioned azimuthally between adjacent inter-engagement structures of the other set; and when the axial securement mechanism is in the engaged condition, each inter-engagement structure of each set axially abuts a corresponding inter-engagement structure of the other set.

16. A press assembly as claimed in claim 15, in which each set comprises four inter-engagement structures.

17. A press assembly as claimed in claim 14, in which the inter-engagement structures are configured so that when the axial securement mechanism is in the disengaged condition, the cartridge can be fully inserted into the bore without the first and second inter-engagement structures contacting each other, a clearance gap being provided between the inter-engagement structures.

18. A press assembly as claimed in claim 1, in which the axial securement mechanism comprises a plurality of series of inter-engagement structures, a first series being provided on the cartridge and a second series being provided on the bore of the frame; in which the inter-engagement structures of the first series are arranged spaced apart axially along the cartridge and the inter-engagement structures of the second series are arranged spaced apart axially along the bore, the first and second series being axially staggered so the when in the engaged condition, the inter-engagement structures of each corresponding series are alternately located axially along the bore and the cartridge, each inter-engagement structure of the first series abutting at least one adjacent inter-engagement structure of the second series.

19. A press assembly as claimed in claim 18, comprising corresponding location seats provided on the cartridge and on the frame, the location seats cooperatively arranged such that when the cartridge is inserted into the bore of the frame, the corresponding location seats abut one another to limit longitudinal displacement of the cartridge with respect to the bore and the corresponding inter-engagement structures on the cartridge and the frame can inter-engage each other without mechanical interference when the insertion body is rotated in the bore.

20. A press assembly as claimed in claim 18, in which the axial securement mechanism comprises a first and second set comprising at least two series of inter-engagement structures in each set; the series within each set being circumferentially spaced apart on the cartridge and in the bore, respectively.

21. A press assembly as claimed in claim 1, in which three series of inter-engagement structures are provided on the cartridge and on the bore.

22. A press assembly as claimed in claim 1, for pressurising a body at an applied pressure of at least 1 GPa.

23. A press assembly as claimed in claim 1, in which the frame is unitary.

24. A press assembly as claimed in claim 1, in which the frame is a link frame comprising a plurality of frame elements connected together.

25. A press assembly as claimed in claim 1, in which the frame has a generally cubic geometry and has six bore holes through each of six sides, each bore hole configured for accommodating a respective cartridge.

* * * * *